United States Patent [19]

Smith

[11] Patent Number: 5,835,724
[45] Date of Patent: *Nov. 10, 1998

[54] SYSTEM AND METHOD FOR COMMUNICATION INFORMATION USING THE INTERNET THAT RECEIVES AND MAINTAINS INFORMATION CONCERNING THE CLIENT AND GENERATES AND CONVEYS THE SESSION DATA TO THE CLIENT

[75] Inventor: John D. Smith, Frisco, Tex.

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 674,954

[22] Filed: Jul. 3, 1996

[51] Int. Cl.⁶ ............................. G06F 17/30; G06F 13/14
[52] U.S. Cl. ............................... 395/200.57; 395/200.32; 395/200.33; 395/200.36; 395/200.47; 707/501
[58] Field of Search ............................... 395/200, 200.01, 395/200.03, 200.09, 610, 200.32, 200.33, 200.47, 200.48, 200.57, 200.58, 200.8; 380/23, 24, 25; 707/1–5, 10, 501, 513, 515; 705/14

[56] References Cited

U.S. PATENT DOCUMENTS

| | | |
|---|---|---|
| 5,530,852 | 6/1996 | Meske, Jr. et al. ................. 395/200.36 |
| 5,544,320 | 8/1996 | Konrad ................................ 395/200.33 |
| 5,590,197 | 12/1996 | Chen et al. ................................ 380/24 |
| 5,594,921 | 1/1997 | Pettus .................................. 395/200.58 |
| 5,630,135 | 5/1997 | Orimo et al. ............................ 395/676 |
| 5,642,515 | 6/1997 | Johnes et al. ....................... 395/200.57 |
| 5,717,816 | 2/1998 | Graber et al. ....................... 395/200.57 |
| 5,721,908 | 2/1998 | Lagarde et al. ..................... 395/200.32 |

OTHER PUBLICATIONS

Text Search and Retrieval Training Manual for the Automated Patent System (APS), Sections 1–3, Oct. 1995–Apr. 1996.

Network and Distributed System Security, 1995, pp. 31–41, Steffen Stemple, "Ipaccess—An Internet Service Acess System Fox Firewall Installations".

Primary Examiner—Parshotam S. Lall
Assistant Examiner—Bharat Barot
Attorney, Agent, or Firm—Christopher W. Kennerly; L. Joy Griebenow

[57] ABSTRACT

In a system (10) for communicating information using the Internet, a client (12) establishes a first connection with a session server (24) using the Internet (18) to initiate a communications session. The session server (24) receives information from a data source (26) in response to the first connection, generates session data (32) using the received information, and conveys the session data (32) to the client (12). The session server (24) maintains the session data (32) after termination of the first connection to convey the session data (32) to the client (12) in response to the client (12) establishing a second connection with the session server (24) during the communications session.

23 Claims, 9 Drawing Sheets

SYSTEM AND METHOD FOR COMMUNICATION INFORMATION USING THE INTERNET THAT RECEIVES AND MAINTAINS INFORMATION CONCERNING THE CLIENT AND GENERATES AND CONVEYS THE SESSION DATA TO THE CLIENT

TECHNICAL FIELD OF THE INVENTION

This invention relates in general to the field of data communications and processing, and more particularly to a system and method for communicating information using the Internet.

BACKGROUND OF THE INVENTION

Many clients use computer networks such as the Internet to receive selected information from a variety of information sources or sites. It is often desirable for clients to establish connections and interact in some manner with servers associated with these sites to receive selected information from the sites. For example, a client might establish a connection and interact with a server associated with a site supported by a banking institution to access banking information concerning the client.

As computer networks and information sources become larger and more complex to serve a variety of information requirements, clients may establish connections and interact with servers associated with any number of sites to receive selected information according to particular needs. A known technique for providing selected information in a client-server environment requires the client to download large volumes of information from the server, including computer programs and other processes, that the client must support and maintain to interactively access particular information. In addition, such techniques require a client whose connection with the server has terminated to establish another connection with the server and again download the entire volume of previously received information to reaccess particular information. Such techniques may also require the client to navigate the entire volume of received information each time the client establishes a connection with the server to access particular information. Furthermore, in addition to sacrificing efficiency and possibly accuracy, such techniques may provide inadequate security for the needs of many clients.

SUMMARY OF THE INVENTION

In accordance with the present invention, the disadvantages and problems associated with systems and methods for communicating information using the Internet have been substantially reduced or eliminated.

In accordance with one embodiment of the present invention, a system for communicating information using the Internet includes a data source, a session server coupled to the data source, and a client that establishes a first connection with the session server using the Internet to initiate a communications session. The session server receives information from the data source in response to the first connection, generates session data using the received information, and conveys the session data to the client. The session server maintains the session data after termination of the first connection to convey the session data to the client in response to the client establishing a second connection with the session server during the communications session.

In a particular embodiment, the session data is arranged in a state hierarchy that includes a number of states, each state associated with a page conveyed to the client. In a more particular embodiment, the states include an ancestor state associated with a first page conveyed to the client in response to the first connection, and a child state associated with a second page conveyed to the client in response to the second connection, the child state generated according to inputs received from the ancestor state.

Important technical advantages of the present invention include providing a system and method for communicating information using the Internet that receives and maintains information concerning the client, including computer programs or processes for interacting with the client, remotely from the client. As a result, the client need only receive a relatively small volume of information in accessing selected information associated with an Internet site or other information source. The present invention also provides a technique for maintaining information previously conveyed to the client between connections with the server, which reduces or eliminates the need for a client whose connection with the server has terminated and who has established another connection with the server to again navigate through the entire volume of previously conveyed information to reaccess particular information. Furthermore, the present invention provides increased efficiency and accuracy without sacrificing security, an advantage of critical importance to many clients.

BRIEF DESCRIPTION OF THE DRAWINGS

For a complete understanding of the present invention and for further features and advantages thereof, reference is now made to the following description taken in conjunction with the accompanying drawings, in which.

DETAILED DESCRIPTION OF THE INVENTION

Figure 1:
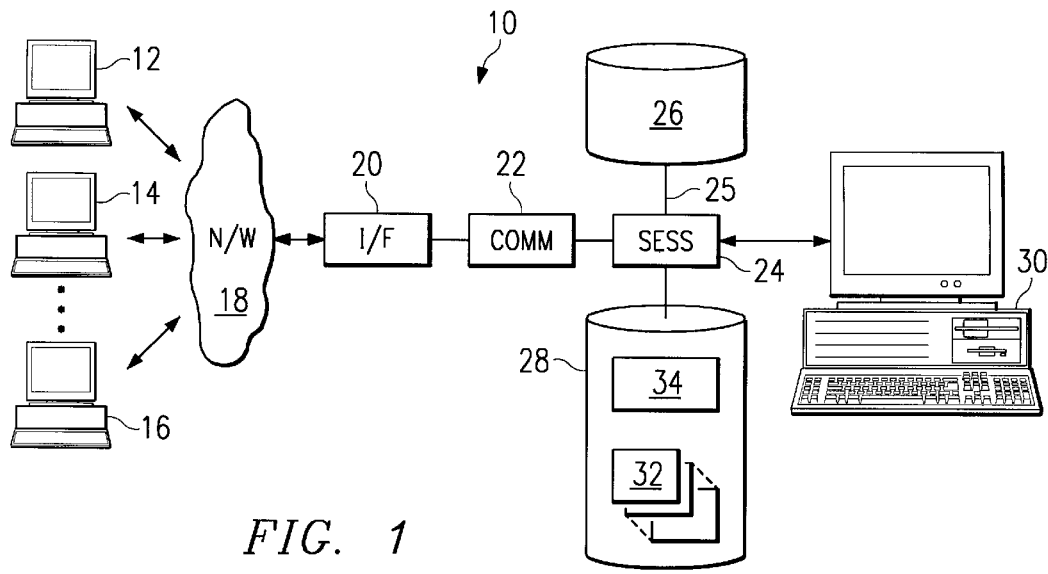
FIG. 1 illustrates an exemplary system for communicating information using the Internet according to the teachings of the present invention.

FIG. 1 illustrates an exemplary system 10 that includes one or more clients 12, 14, and 16, referred to generally as client 12, a communications network (N/W) 18, an interface (I/F) 20, a communications server (COMM) 22, a session server (SESS) 24, a data source 26, a memory 28, and a programmer 30. System 10 interacts with client 12 to provide selected information concerning client 12 that session server 24 maintains during a particular communications session that corresponds to client 12.

In client-server environments such as the Internet, a client establishes a connection with a server associated with an Internet site, the client interacts with the server to obtain selected information, and the connection with the server is terminated after the client obtains the selected information. In interacting with the server to obtain information, the client navigates a hierarchy of documents or pages written or otherwise generated using HyperText Markup Language (HTML), JAVA, or any other suitable content development language that conveys text, images, sounds, actions, or other information to the client. The connection between the client and the server may be terminated after the client progresses forward and backward through any number of these pages.

In existing systems, if the connection between the client and the server is terminated at a particular page, and the client later establishes another connection with the server to obtain additional information associated with the page or another previously accessed page, the client is often forced to again navigate the hierarchy of pages to reach the desired page because the server does not maintain information to allow the client to access the desired page directly upon establishing the second connection with the server. This problem may be exacerbated if the creation and presentation of lower level pages depends on information retrieved by, included in, received from, or otherwise associated with higher level pages.

In the present invention, when client 12 establishes a connection with session server 24, system 10 initiates a communications session to service client 12 and receives selected information concerning client 12 from data source 26. System 10 generates session data 32 for client 12 according to information received from data source 26, inputs received from client 12, and a hierarchy of states defined and maintained at session server 24 that client 12 navigates during the session to interactively access session data 32. System 10 maintains session data 32 in memory 28 during the session to allow client 12 to access, after the connection between client 12 and session server 24 terminates and client 12 establishes another connection with server 24 during the session, session data 32 associated with one or more states client 12 progressed through after establishing a previous connection with session server 24. Client 12 need not again navigate the entire hierarchy of states to reaccess session data 32 or generate new session data 32 associated with a desired state after client 12 establishes the later connection with session server 24.

Data source 26 may be any source of information concerning one or more persons, groups, businesses or other organizations, industries, applications or contexts, or any other information clients 12 may seek to access according to system 10. For example, data source 26 associated with a banking institution might contain banking information concerning persons, organizations, or other customers. Data source 26 may include one or more databases, files, or other data repositories at a single or multiple locations local to or remote from session server 24. Data source 26 may be more or less permanent or may include one or more temporary databases, files, or other data repositories created by extracting information from more permanent databases, files, or other repositories.

Session server 24 is coupled to and interacts with data source 26 using link 25 to retrieve, receive, or otherwise obtain information from data source 26 according to needs of the persons or organizations that support data source 26 and clients 12. Link 25 may include any dedicated or switched communications network, local area network (LAN), metropolitan area network (MAN), wide area network (WAN), a network operating according to the X.25 recommendation, a global computer network such as the Internet, or any other network or mechanism for providing and distributing information.

For each client 12 that establishes a connection with session server 24 to obtain information from data source 26, session server 24 initiates a communications session, assigns a unique session identifier to the session, generates session data 32 for the session, stores session data 32 in memory 28 according to the session identifier, and maintains session data 32 in memory 28 during the session. Session data 32 may include any information for generating, processing, manipulating, reproducing, communicating, or conveying information received from data source 26 to client 12. For example, session data 32 may include, without limitation: information received from data source 26; information received from client 12; pages to convey information received from data source 26 to client 12; routines, programs, functions, function calls, processes, and other information used to generate pages or new session data 32; and other information suitable for generating, maintaining, and conveying information received from data source 26 to client 12 during the communications session for client 12. If the connection between client 12 and session server 24 terminates and client 12 establishes another connection with session server 24 during the session, session server 24 accesses session data 32 in memory 28 to interactively convey session data 32 to client 12, in the form of pages or otherwise, rather than again accessing data source 26 to retrieve, receive, or otherwise obtain information from data source 26.

Memory 28 may include one or more databases, files, or other data repositories at a single or multiple locations local to or remote from session server 24. Memory 28 may include fixed or removable storage media, such as magnetic computer disks, CD-ROM, or other suitable volatile or non-volatile memory. Memory 28 supports a database management system (DBMS) 34 integral to or separate from session server 24 that manages access to session data 32 and other resources of memory 28.

Programmer 30 may program, design, modify, configure, or otherwise customize session server 24 to allow session server 24 to operate in accordance with the type, nature, or context of information received from data source 26, needs of persons or organizations associated with data source 26 and clients 12, or other suitable factors. For example, and not by way of limitation, data source 26 may contain banking information concerning clients 12, and programmer 30 may program, configure, or customize session server 24 to interactively generate session data 32 and convey session data 32 to clients 12 in pages containing selected banking information.

In one embodiment, programmer 30 programs, configures, or customizes session server 24 using an application programming interface (API) integral to session server 24. The API is a collection of routines, commands, data structures, virtual and other functions, virtual and other function calls, data definitions, and other variables that control one or more operations of session server 24. In general, the API allows overlying software to become part of session server 24 to suit a particular context or application. Using the API to control the operation of session server 24, system 10 dynamically generates session data 32 according to interactions with clients 12 and a state hierarchy to convey pages to clients 12 associated with states in the state hierarchy.

Programmer 30 may use any suitable programming technique, structure, paradigm, or language to customize session server 24. For example, programmer 30 may customize session server 24 using an object-oriented programming language, in which a program may be viewed as a collection of discrete objects or instances that are self-contained collections of data structures and routines that interact with other objects. In object-oriented programming, a class defines attributes, services, data structures, routines, or other information characterizing objects in or instances of the class. In one embodiment, the classes correspond to particular states or associated pages through which client 12 progresses in navigating the state hierarchy wholly or partially defined by the API. Programmer 30 may use C++ or another suitable programming language to program, configure, or customize session server 24 using an API or other suitable programming tool.

Communications server 22 is coupled to and interacts with session server 24 to communicate information between session server 24 and clients 12 using interface 20 and network 18. In one embodiment, communications server 22 may encrypt session data 32 and other information received from session server 24 to provide secure communications between session server 24 and clients 12. Communications server 22 may encrypt information or make information undecipherable using the Data Encryption Standard (DES) algorithm, the Pretty Good Privacy (PGP) standard, the public key or other asymmetric encryption scheme, or any other suitable encryption standard or technique. In one embodiment, communications server 22 spawns, creates, or otherwise generates processes that allow session server 24 to communicate with client 12 during the session.

Clients 12 may be any logical entities in hardware and/or software, such as mainframes, miniframes, or personal computers, that send and receive information using network 18 and interface 20 to access the resources of session server 24. Clients 12 may be autonomous or operated by one or more persons that seek access to selected information provided by data source 26. Although clients 12, 14, and 16 are discussed, the present invention contemplates more or fewer clients according to the information provided by data source 26, the needs of persons or organizations that support data source 26 and clients 12, or other suitable factors. Programmer 30 may be similar in construction and operation to clients 12, and may be a client 12 having particular administrative, security, or other access privileges or credentials that connects to session server 24 using network 18.

Clients 12 interact with communications server 22 using network 18 and interface 20. Network 18 may include any suitable wireline or wireless links to facilitate communications between clients 12 and interface 20. For example, network 18 may include a public switched telephone network (PSTN), an Integrated Services Digital Network (ISDN), a LAN, MAN, WAN, a global computer network such as the Internet, or other dedicated or switched network or other communications mechanism at one or more locations. Interface 20 may include the appropriate hardware and software, including protocol conversion and data processing capabilities, to communicate using a direct connection to a PSTN or ISDN, a connection through a LAN, MAN, WAN, a global computer network such as the Internet, or any other suitable communications connection that allows clients 12 to communicate information with communications server 22 using network 18.

In operation, client 12 establishes a connection with session server 24 using network 18, interface 20, and communications server 22. Session server 24 initiates a communications session for client 12, assigns a unique session identifier to the session, receives selected information concerning client 12 from data source 26, generates session data 32 according to the received information, inputs from client 12, and a state hierarchy, and stores session data 32 in memory 28 according to the session identifier. In response to communications from client 12, including the communications that established the initial connection or communications that establish subsequent connections, session server 24 interacts with client 12 using communications server 22, interface 20, and network 18 to convey session data 32 to client 12. Session server 24 may convey session data 32 in the form of pages or other arrangement of information, which may include HTML, JAVA, or other content development language.

Session server 24 maintains session data 32 in memory 28 during the session to allow client 12 to establish another connection with session server 24 during the session, after previous connections with session server 24 have terminated, to access session data 32 that corresponds to one or more states or associated pages client 12 has progressed through in response to previous connections with session server 24 during the session. The retention of session data 32 may be particularly important when session server 24 is an Internet server, since typical Internet browsing involves establishing and terminating a series of connections. Client 12 need not again navigate the entire hierarchy of states or pages to reach a desired state after establishing another connection with session server 24. Moreover, session server 24 retains information retrieved from data source 26 and can use this information throughout the communications session without ever reaccessing data source 26, without reaccessing data source 26 more than a minimal number of times during the session, or without reaccessing data source 26 as frequently during the session as if session server 24 did not maintain information retrieved from data source 26 during the session. As a result, system 10 reduces the volume of information communicated among client 12, session server 24, and data source 26 to provide increased efficiency, accuracy, and security.

Figure 2:
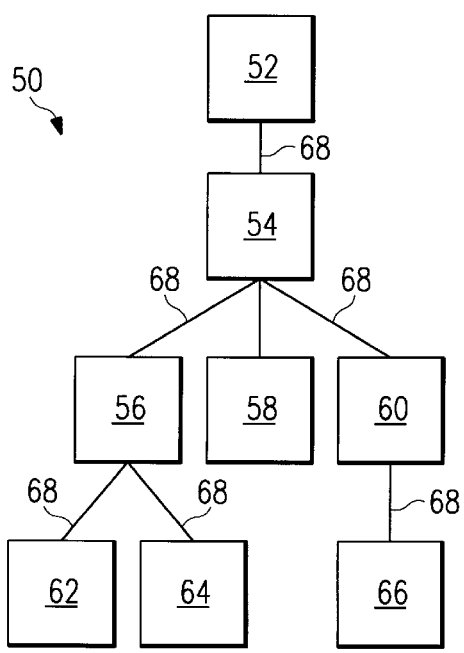
FIG. 2 illustrates an exemplary state hierarchy according to the present invention.

FIG. 2 illustrates an exemplary state hierarchy 50 that specifies a logical relationship between states 52, 54, 56, 58, 60, 62, 64, and 66. Each state in state hierarchy 50 is related to one or more other states and is either the ancestor state of a child state that is below the ancestor state in state hierarchy 50, or the child state of an ancestor state that is above the child state in state hierarchy 50. For example, state 52 is an ancestor state of all the other states in state hierarchy 50; state 54 is a child state of state 52 and an ancestor state of states 56, 58, 60, 62, 64, and 66; state 56 is a child state of states 52 and 54, and an ancestor state of states 62 and 64; and state 64 is a child state of states 52, 54, and 56, and an ancestor state of no other state in state hierarchy 50. Each state in state hierarchy 50 is coupled to another state by one or more branches 68, depending on the respective positions of the two states within state hierarchy 50.

In one embodiment, each state corresponds to session data 32 for a particular communications session of client 12 that is generated using information received from data source 26, inputs from client 12, inputs from an ancestor state, and other appropriate information. Each state is associated with a page written in HTML, JAVA, or another suitable content development language that conveys session data 32 to client 12 as text, images, sounds, actions, and other information. Interacting with session server 24, client 12 navigates state hierarchy 50 to enter and progress through various states to receive session data 32 for these states. As client 12 progresses forward and backward through the various states, session server 24 conveys session data 32 to client 12 in the form of pages that correspond to the states. From the perspective of client 12, the pages that convey session data 32 may be organized according to a windowing hierarchy or environment common to many software applications. The arrangement of session data 32 within memory 28 is discussed more fully below with reference to FIG. 3.

For example, upon establishing a connection with session server 24, client 12 may reside in state 52 and session server 24 may convey a page to client 12 that is the Internet home page for a person or organization that supports data source 26, for example, a banking or other institution. State 52 may represent a page conveyed to client 12 that prompts client 12 to provide customer identification information. Client 12 may provide this information, and session server 24 accesses data source 26 to retrieve all available banking information associated with client 12. In one embodiment, session server 24 retrieves information from data source 26 only one time during the communications session for client 12, and can use this retrieved information to generate all states in state hierarchy 50.

If client 12 progresses from state 52 to state 54, which is a child state of state 52, session server 24 may present client 12 with a page that provides a main menu for selecting a particular child state of state 54. For example, where session server 24 receives banking information from data source 26, a particular client 12 that resides in state 54 may be conveyed a page that displays a list of available accounts from which client 12 may obtain account information. Similarly, child states 56, 58, and 60 of state 54 might have associated pages to convey checking account, savings account, and money market account information, respectively, to client 12. Further, child states 62 and 64 of state 56 might have associated pages to convey checking deposit and checking withdrawal information, respectively, to client 12. Each child state is generated according to inputs from the ancestor of the child state, in addition to any information received from data source 26 or inputs from client 12 that are used to generate the new state. State hierarchy 50 may include more or fewer states, depending on the information received from data source 26, the needs of persons or organizations that support data source 26 and clients 12, and other suitable factors.

An important technical advantage of the present invention is that clients 12 may interact with session server 24 to progress forward and backward in a variety of ways through the various pages that convey session data 32 to clients 12. A particular client 12 may remain in the current state, may progress forward to enter a child state of the current state, or may progress backward to enter any ancestor state of the current state. For example, client 12 residing in state 56 might progress forward to enter state 64, which is a child of state 56, or might progress backward to enter either state 54 or state 52, both of which are ancestors of state 56. As discussed more fully below, session server 24 maintains and arranges session data 32 according to state hierarchy 50 between connections with client 12.

In one embodiment, each state for which session server 24 maintains session data 32 is either the current state or an ancestor state of the current state. Session server 24 dynamically generates session data 32 for each child state, including the current state, according to inputs from the ancestor of the child state. As a result, session data 32 within memory 28 for each state, including the current state, includes information received as inputs from an ancestor state to dynamically generate the particular state. If the connection between client 12 and session server 24 terminates and client 12 establishes another connection with session server 24 during the session, client 12 may return directly to the current state or an ancestor of the current state to access session data 32 for the current or ancestor state without session server 24 regenerating session data 32 or again accessing data source 26 for information. Furthermore, because each state contains information received from its ancestors, client 12 may progress forward or backward through state hierarchy 50 in the same manner as if the connection between client 12 and session server 24 had not terminated.

Figure 3:
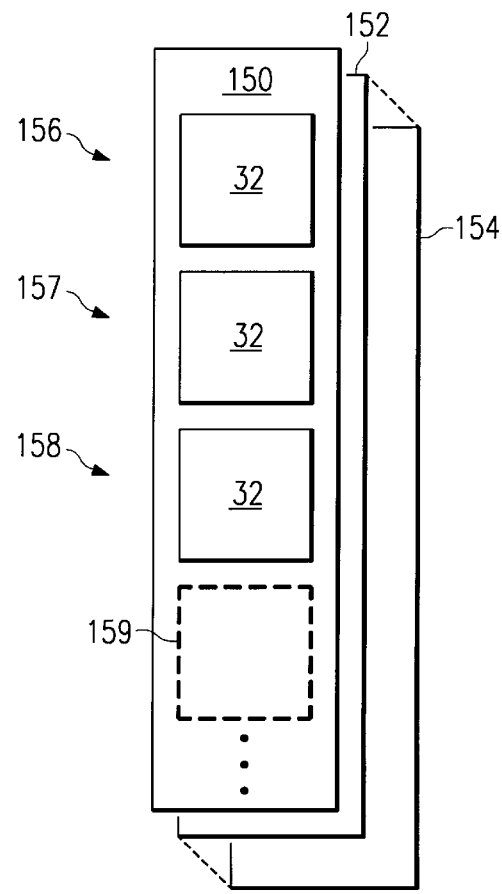
FIG. 3 illustrates an exemplary state data stack according to the present invention.

FIG. 3 illustrates exemplary state data stacks 150, 152, and 154, referred to generally as state data stack 150, that contain session data 32 for a communications session corresponding to a particular client 12. State data stack 150 may be single or multiple files or other reserved regions at one or more locations in memory 28. State data stack 150 may include one or more files or any other storage allocation. In one embodiment, state data stack 150 contains session data 32 for each state that client 12 entered or progressed through during the session, and may store session data 32 on a last in, first out (LIFO) or other suitable basis. State identifiers may indicate the locations of session data 32 for the various state within state data stack 150.

In one embodiment, for each state client 12 enters or progresses through during the session, session server 24 dynamically generates session data 32, assigns a unique state identifier to session data 32, and stores session data 32 separately in state data stack 150 according to a state identifier for the state. For example, state data stack 150 may contain session data 32 for states 52, 54, and 56, as indicated by arrows 156, 157, and 158, respectively, that have associated pages to convey home page information for a banking institution, account list information for client 12, and checking account information for client 12, respectively. As client 12 navigates state hierarchy 50, session server 24 generates new session data 32 and pushes, adds, or otherwise stores session data 32 in state data stack 150 each time client 12 progresses forward from a current state to a child state.

In a particular embodiment, each child state is based upon and dynamically generated according to inputs from one or more ancestor states of the child state, including the current state. These inputs from ancestor states to child states may be generated automatically or received as input from client 12 as client 12 makes decisions concerning the navigation of state hierarchy 50 and the session data 32 client 12 seeks to access.

As indicated by the dashed lines 159, state data stack 150 at one time contained session data 32 generated using inputs from state 56 and corresponding to a child state 62 or 64 of state 56. In one embodiment, as client 12 navigates state hierarchy 50, session server 24 pops, deletes, or otherwise removes session data 32 for one or more states from state data stack 150 and memory 28 each time client 12 progresses backward from a current state to enter an ancestor of the current state. Client 12 may progress backward from the current state to enter an ancestor of the current state that is separated from the current state by a single branch 68, in which case session server 24 deletes session data 32 for only the current state, or multiple branches 68, in which case session server 24 also deletes session data 32 for any intervening ancestor states.

Regardless of the manner in which client 12 progresses backward through state hierarchy 50 to enter a particular ancestor state, session server 24 need not regenerate session data 32 for the ancestor state because state data stack 150 maintains session data 32 for each ancestor state during the session. When client 12 enters the ancestor state, session server 24 need only convey the existing session data 32 to client 12, in the form of an HTML page or otherwise. In a particular embodiment, session server 24 determines which states are ancestor states of the current state using parameters, for example, one or more state identifiers, that are passed to session server 24 as inputs from the current state. As the above discussion demonstrates, state data stack 150 may grow and shrink throughout the session according to the position of client 12 within state hierarchy 50.

Figure 4:
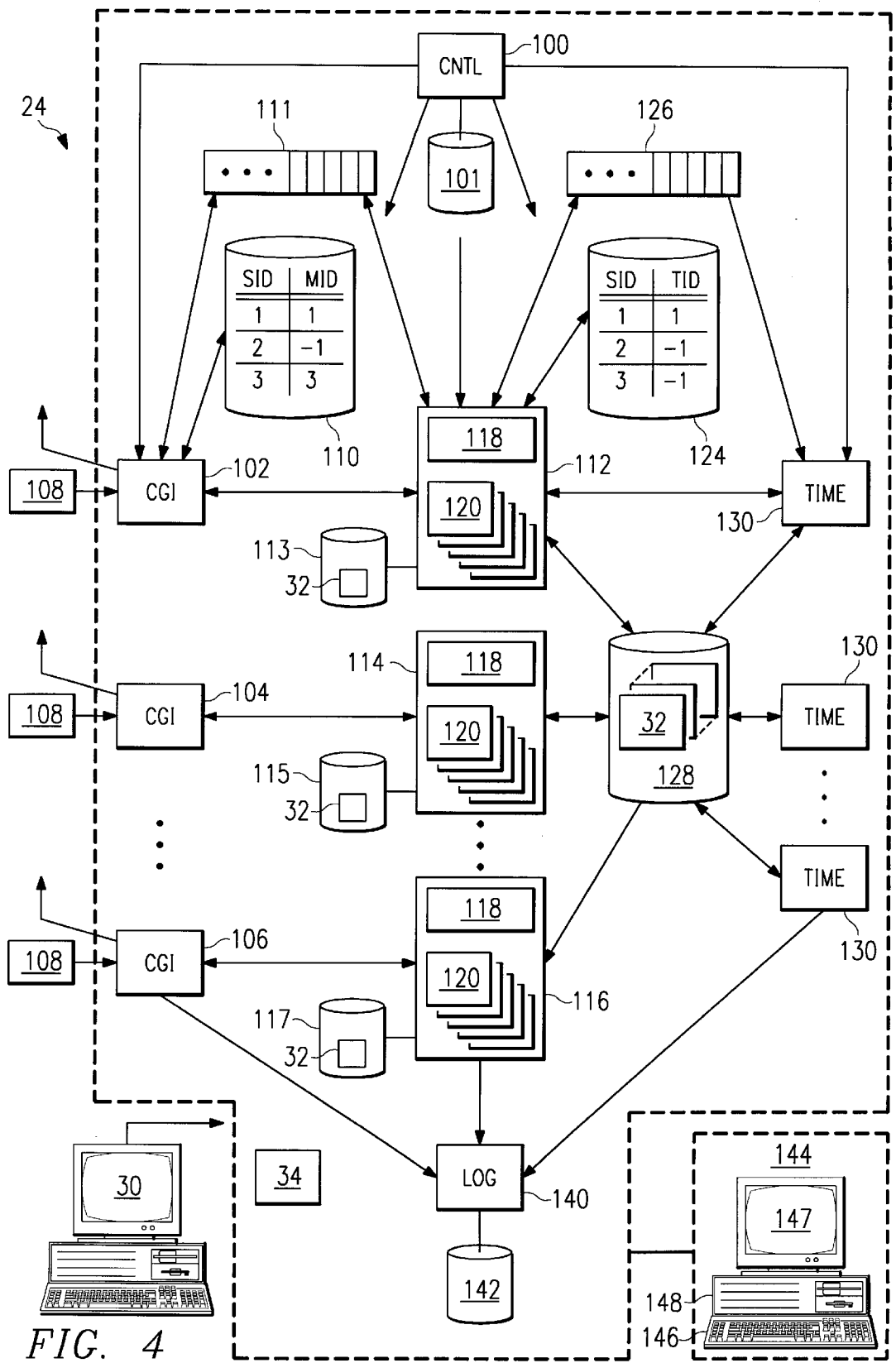
FIG. 4 illustrates an exemplary session manager according to the present invention.

FIG. 4 illustrates an exemplary session server 24 that includes a control process (CNTL) 100, one or more common gateway interfaces (CGI) 102, 104, and 106, one or more session managers 112, 114, and 116, one or more timer processes (TIME) 130, and a log process (LOG) 140. Control process 100 creates, spawns, or otherwise initiates session managers 112, 114, and 116, referred to generally as session manager 112, timer processes 130, and log process 140 at startup of session server 24 or in response to one or more events or conditions. Communications server 22 creates, spawns, or otherwise generates CGIs 102, 104, and 106, referred to generally as CGI 102, in response to clients 12 establishing connection with communications server 22 or session server 24. Control process 100 and communications server 22 may initiate CGIs 102, session managers 112, timer processes 130, and log process 140 serially, more or less simultaneously, or in any other temporal relationship.

Control process 100 also configures and monitors various other processes and files within session server 24 during each communications session initiated for clients 12. Control process 100 is coupled to and interacts with a configuration file 101 containing configuration parameters that specify, without limitation: the number of session managers 112 initiated to service clients 12; specified aspects of the operation of session managers 112; the number of timer processes 130 initiated to interact with session managers 112; configurable time intervals and other specified aspects of the operation of timer processes 130; and any other configurable information concerning the operation of session server 24.

For each client 12 that establishes a connection with session server 24, session server 24 initiates a separate session and communications server 22 spawns or otherwise generates a separate CGI 102 to communicate with client 12 during at least one connection during the session. Client 12 may establish a connection with session server 24 by communicating any suitable information to session server 24 before or during the session corresponding to client 12, for example, by communicating a request to receive a page containing particular information associated with client 12 and received from data source 26. Client 12 may establish any number of connections with session server 24 during the corresponding session, and a new CGI 102 may handle communications during each new connection. CGI 102 may receive data requests 108 or other information from client 12, may receive information from data source 26 at the direction of session manager 112, may receive commands, instructions, or other information from control process 100, and may communicate responsive or other information to client 12, data source 26, and control process 100 at any time during the life of CGI 102.

Data requests 108 may be any requests, signals, indications, or other communications to allow clients 12 to establish connections with session server 24, login or provide other identification information, navigate state hierarchy 50 and associated pages, and access selected information received from data source 26. For example, data request 108 might request session server 24 to convey particular banking information concerning client 12, to convey a page associated with a specified state, or to perform any other operation on or involving session data 32. The present invention contemplates data request 108 being an indication that client 12 has connected or attempted to connect to communications server 24. In general, CGI 102 communicates data requests 108 and other information between client 12 and a particular session manager 112 that is currently handling the session corresponding to client 12.

In one embodiment, CGI 102 is a transient process that receives data requests 108 and other information from a particular client 12, communicates data requests 108 and other information to a particular session manager 112 handling the session or a session manager 112 that becomes available to handle the session, receives responsive or other information from session manager 112, communicates the received information to client 12 using communications server 22, and then terminates, dies, or otherwise ceases processing. CGIs 102 may each have an associated CGI identifier that allows control process 100 to monitor the number and activities of CGIs 102. The present invention contemplates CGI 102 communicating with a single or multiple clients 12 or session managers 112 during any portion of one or more sessions.

Session server 24 includes a session manager mapping file 110 that relates the unique session identifier (SID) for each session to a session manager identifier (MID) corresponding to a particular session manager 112, if any, that is currently handling the session. For example, mapping file 110 may indicate that a session manager 112 having an MID of "1" is handling the session having an SID of "1," and a session manager 112 having an MID of "3" is handling the session having an SID of "3." Mapping file 110 may also indicate that no session manager 112 is handling a particular session, for example, by associating a negative MID with the SID for the session. In one embodiment, CGIs 102, session managers 112, and control process 100, alone or in any combination, specify, access, monitor, and update the information in mapping file 110 according to the operation of session server 24.

Session server 24 includes a request message queue 111 that stores data requests 108 or other message information for communication to session managers 112. In one embodiment, session server 24 stores data requests 108 communicated from CGI 102 in request message queue 111 in response to control process 100 determining that no session manager 112 is handling the corresponding session. Request message queue 111 stores data requests 108 in any ordered or other arrangement and allows available session managers 112 to remove data requests 108 on a first in, first out (FIFO), last in, first out (LIFO), priority, or other suitable basis. Request message queue 111 may support unidirectional or bidirectional messaging with CGIs 102, session managers 112, and control process 100.

Each session manager 112 supports and operates according to an API 118 that, as discussed above in connection with FIG. 1, is a collection of routines, commands, data structures, virtual and other functions, virtual and other function calls, data definitions, and other variables that control one or more operations of session managers 112 and the other components of session server 24. API 118 specifies or defines state hierarchy 50 and associated pages that convey session data 32 to clients 12 and with which clients 12 interact to request session data 32. For example, API 118 may specify a data structure for state information used to define each state in state hierarchy 50; a home page state or base class from which each child state in state hierarchy 50 may be created, defined, generated, or otherwise derived by inheritance; the content of and relationships between the states in state hierarchy 50; skeleton pages that session server 24 completes dynamically with input from clients 12 and information from data source 26 to progress from a current state to a child state; for each state in state hierarchy 50, the nature and content of the information conveyed to clients 12 that enter the state; and other parameters affecting operation of session server 24.

A particular API 118 that corresponds to a particular session manager 112 may be unique, or wholly or partially identical to another API 118 associated with a different session manager 112. Some or all session managers 112 may share or operate according to the same API 118. As discussed above with reference to FIG. 1, programmer 30 may wholly or partially program, configure, define, or customize session server 24 using API 118. The present invention contemplates any suitable relationship between at least one API 118 and session managers 112. Each session manager 112 may include or support an associated timer to measure specified time intervals during the operation of session server 24, for example, a first two minute time interval that begins when the connection between session server 24 and client 12 terminates.

Each session manager 112 includes processes 120 that perform various operations according to the operation of session server 24. Processes 120 may include a validate inputs process 120 that allows session manager 112 to verify that inputs to session manager 112, from client 12 or otherwise, include a session identifier or that session manager 112 can generate a new session identifier; that inputs to session manager 112, from client 12 or otherwise, include a state identifier or that session manager 112 can generate a new state identifier; or that inputs to session manager 112, from client 12 or otherwise, are suitable in any other respect. Validate inputs process 120 may also allow session manager 112 to return an error state and associated page to inform client 12 if inputs are not validated in some manner.

A pre-process inputs process 120 allows session manager 112 to perform any suitable operation to validate selected aspects of inputs to session manager 112, whether these inputs are received from client 12, data source 26, or automatically generated by components of session server 24 or system 10, for example, usernames, passwords, session identifiers, state identifiers, data entry formats, and other aspects of the inputs. A process inputs process 120 allows session manager 112 to process validated inputs to the current state, whether these inputs are received from client 12, data source 26, or automatically generated by components of session server 24 or system 10, to allow the corresponding client 12 to progress to a new state according to the validated inputs. An allocate stack data process 120 allows session manager 112 to dynamically allocate memory to create objects or other application defined data structures as client 12 progresses to a new state, for example, a child state of the current state. A deallocate stack data process 120 allows session manager 112 to deallocate memory as client 12 progresses to a new state, for example, an ancestor state of the current state. A generate page process 120 allows session manager 112 to generate HTML or other pages associated with a new state using inputs from the current state as client 12 progresses from the current to the new state. Session manager 112 may support any other process 120 suitable to perform various operations in accordance with the operation of session server 24.

Each session manager 112, 114, or 116 has an associated local memory 113, 115, or 117, respectively, that maintains session data 32 for the corresponding session while the particular session manager 112, 114, or 116 is handling the session. If a particular session manager 112 ceases handling the corresponding session at some point during the session, session data 32 may be copied from local memory 113 to general memory 128 and maintained in general memory 128 for the duration of the session, or until an available session manager 112, 114, or 116 is again handling the session.

General memory 128 may include one or more databases, files, or other data repositories at a single or multiple locations internal or external to session server 24. General memory 128 may store and retrieve session data 32 according to memory addresses, object identifiers that claim or otherwise allocate memory, or other suitable storage or retrieval technique. Memory 28 discussed above with reference to FIG. 1 may include some or all local memories 113, 115, and 117, referred to generally as local memory 113, and general memory 128. Whether session data 32 is maintained in local memory 113 or general memory 128, session server 24 maintains and need not regenerate pages already conveyed to client 12. Moreover, session server 24 may access data source 26 only one time during each communications session without reaccessing data source 26 to provide session data 32 to client 12 if the connection with client 12 terminates and client 12 later establishes another connection with session server 24 during the session. In general, DBMS 34 manages access by session manager 112 and other components of session server 24 and system 10 to the resources of local memory 113 and general memory 128.

Session server 24 includes a configurable number of timer processes 130 that are coupled to and interact with session managers 112, timer message queue 126, general memory 128, and log process 140. Timer processes 130 measure time intervals at various points and between various events during the operation of session server 24. For example, each timer process 130 may measure the first two minute time interval that begins when the connection with client 12 terminates, a second eight minute time interval that begins when session data 32 for a particular session is moved from local memory 113 to general memory 128, both of these specified time intervals, or any other suitable time interval. In one embodiment, timer process 130 begins to measure a specified time interval in response to a start timing message from session manager 112, and ceases measuring a specified time interval in response to a stop timing message from session manager 112. Session manager 112 may notify session manager 112 when a specified time interval has elapsed. Timer process 130 may begin and cease measuring any number of specified or other time intervals in response to any suitable event or condition during the operation of session server 24.

Timer process mapping file 124 relates the unique session identifier (SID) for each session to a timer process identifier (TID) that corresponds to a particular timer process 130, if any, that is currently measuring a time interval for the session. For example, mapping file 124 may indicate that a timer process 130 having a TID of "1" is handling the session having an SID of "1." Mapping file 124 may also indicate that no timer process 130 is currently handling a particular session, for example, by associating a negative TID with the SID for the session. Control process 100, session managers 112, and timer processes 130, alone or in any combination, may specify, access, monitor, and update the information contained in mapping file 124 during the operation of session server 24. Timer process mapping file 124 may be similar in both construction and operation to session manager mapping file 110 discussed above.

Timer process message queue 126 stores messages or other information for communication to one or more timer processes 130. In one embodiment, a particular message communicated from session manager 112 is stored in timer process message queue 126 in response to control process 100 determining that no timer process 130 is handling the corresponding session. The messages in timer process message queue 126 may include a start timing message, a stop timing message, or other instruction to begin or cease measuring a time interval according to the operation of session managers 112. Timer process message queue 126 may store messages in any ordered or other arrangement and may allow available timer processes 130 to access messages on a FIFO, LIFO, priority, or other suitable basis. Timer process message queue 126 may support unidirectional or bidirectional messaging with session managers 112, timer processes 130, and control process 100. Timer process message queue 126 may be similar in both construction and operation to request message queue 111.

Log process 140 is coupled to and interacts with control module 100, CGIs 102, session managers 112, and timer processes 130 to record information in log file 142 according to the operation of session server 24. Log process 140 may record any suitable information received from other components of session server 24 or system 10, and may manipulate this information in any suitable manner before, during, or after recording the information in log file 142. Session server 24 may generate reports using information communicated to log process 140 for persons or organizations associated with data source 26, clients 12, session server 24, or other component of system 10.

Session server 24 may operate on one or more computers 144 at one or more locations that are integral to or separate from the hardware and software that support session manager mapping file 110, request message queue 111, configuration file 101, timer process mapping file 124, timer message queue 126, local memories 113, general memory 128, and log file 142. Computer 144 may include an input device 146 such as a key pad, touch screen, microphone, or other device that can accept information. An output device 147 may convey information associated with the operation of session server 24, including digital or analog data, visual information, or audio information. Both input device 146 and output device 147 may include fixed or removable storage media, such as magnetic computer disks, CD-ROM, or other suitable media to both receive output from and provide input to session server 24. Computer 144 may have one or more processors 148 and associated volatile or non-volatile memory to execute instructions and manipulate information in accordance with the operation of control module 100, CGIs 102, session managers 112, timer processes 130, and log process 140 within session server 24.

In operation of session server 24, client 12 establishes a connection with and communicates a data request 108 or other information to session server 24 using network 18, interface 20, and communications server 22. Communications server 22 spawns or otherwise generates CGI 102 to service client 12 during the particular connection, and CGI 102 receives data request 108 from client 12 and communications server 22. Control process 100 initiates a communications session for client 12, CGI 102 assigns a unique session identifier to the session, alone or in cooperation with control process 100, and CGI 102 or control process 100 communicates the session identifier to session manager mapping file 110.

CGI 102 accesses session manager mapping file 110 to determine which session manager 112 is currently handling the session, if any, and either communicates data request 108 to the appropriate session manager 112 or to request message queue 111 for subsequent access by an available session manager 112. A particular session manager 112 receives data request 108 from CGI 102 or request message queue 111 and, using CGI 102 or in some other manner, receives, retrieves, or otherwise obtains information concerning client 12 from data source 26 according to data request 108 or other factors. CGI 102, session manager 112, or control process 100, alone or in any combination, updates session manager mapping file 110 to indicate the association of the particular session manager 112 with the session.

Session manager 112 generates session data 32 for the session according to state hierarchy 50, information received from data source 26, and inputs received from client 12, and stores session data 32 in local memory. Session manager 112 interacts with client 12 according to state hierarchy 50 to convey session data 32 to client 12, in the form of HTML pages or otherwise, that corresponds to the states through which client 12 progresses during the session. Session manager 112 also interacts with client 12 to receive data requests 108 and other inputs for use in generating new session data 32.

In response to termination of a current connection between client 12 and session server 24, session manager 112 either begins measuring a first specified time interval, for example, the two minute interval that corresponds to the time that has elapsed since the connection with client 12 terminated. Alternatively, session manager 112 may access timer process mapping file 124 to determine that no timer process 130 is currently measuring a time interval for the session, and communicate a start timing message to timer message queue 126 for subsequent access by an available timer process 130. A particular timer process 130 would then receive the start timing message from timer message queue 126 and begin measuring the first specified time interval, and control process 100, session manager 112, and timer process 130, alone or in any combination, would update timer process mapping file 124 to indicate the association of timer process 130 with the session.

If client 12 establishes another connection with session server 24 within the first specified time interval, communications server 22 spawns or otherwise generates CGI 102 to service client 12. CGI 102 receives a data request 108 or other inputs from client 12, accesses session manager mapping file 110 to determine that session manager 112 is currently handling the session, and communicates data request 108 to session manager 112. In response, session manager 112 stops measuring the first specified time interval, or accesses timer process mapping file 126 to determine the identity of the particular timer process 130 currently measuring the first specified time interval and communicates a stop timing message to timer process 130. Control process, session manager 112, and timer process 130, alone or in any combination, update timer process mapping file 124 to reflect the disassociation of the particular timer process 130 from the session. Session manager 112 accesses session data 32 within local memory 112 to interact with client 12 in accordance with state hierarchy 50.

If the connection terminates and client 12 establishes another connection with session server 24 as discussed above, session server 24 operates similarly. If client 12 does not establish another connection with session server 24 within the first specified time interval, as measured by session manager 112 or timer process 130, session manager 112 copies session data 32 from local memory 113 to general memory 128, communicates a start timing message to timer message queue 126 for access by an available timer process 130, and ceases handling the session. A particular timer process 130 receives the start timing message from timer message queue 126 and begins measuring a second specified time interval, for example, an eight minute time interval, that corresponds to the time that has elapsed since session manager 112 moved session data 32 to general memory 128 and ceased handling the session. Control process 100, session manager 112, and timer process 130, alone or in any combination, update timer process mapping file 124 to indicate the association of the particular timer process 130 with the session.

If client 12 establishes another connection with session server 24 within the second specified time interval, CGI 102 receives a data request 108 or other input information from client 12, accesses session manager mapping file 110 to determine that no session manager 112 is currently handling the session, and communicates data request 108 to request message queue 111 for access by an available session manager 112. A particular session manager 112 receives data request 108 from request message queue 111, accesses timer process mapping file 126 to determine the identity of the particular timer process 130 that is currently measuring the second time interval for the session, communicates a stop timing message to timer process 130, and accesses session data 32 within general memory 128 to interact with client 12 according to state hierarchy 50. Control process 100, CGI 102, and session manager 112, alone or in any combination, update session manager mapping file 110 to indicate the association of the particular session manager 112 with the session.

If client 12 does not establish another connection with session server 24 within the second specified time interval, such that timer process 130 does not receive a stop timing message from session manager 112 during the second specified time interval, timer process 130 causes session data 32 to be deleted from general memory 128 and the session corresponding to client 12 terminates. Whether client 12 establishes another connection with session server 24 during the first specified time interval, such that session manager 112 accesses session data 32 within local memory 113, or during the second specified time interval, such that session manager 112 accesses session data 32 within general memory 128, system 10 maintains session data 32 between connections during the session corresponding to client 12.

Figure 5:
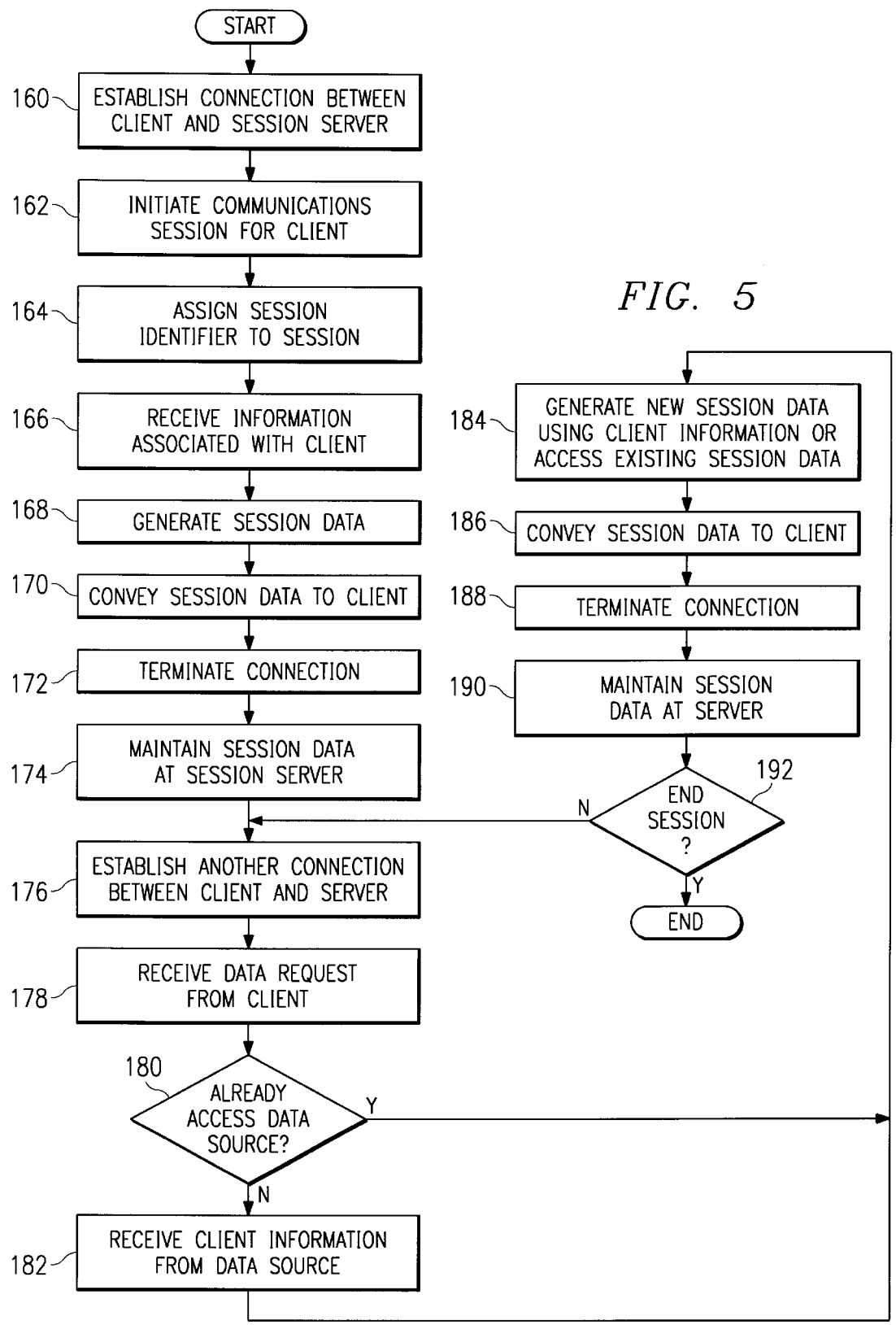
FIG. 5 illustrate an exemplary method for communicating information using the Internet according to the present invention.

FIG. 5 illustrates an exemplary method for communicating information using the Internet. The method begins at step 160, where a connection is established between client 12 and session server 24. Session server 24 initiates a communications session for client 12 at step 162 and, at step 164, assigns a unique session identifier to the session. Session server 24 receives information associated with client 12 from data source 26 at step 166, generates session data 32 for client 12 using the received information at step 168, and conveys session data 32 to client 12 at step 170. After the connection with client 12 is terminated at step 172, session server 24 maintains session data 32 at step 174 for subsequent access by client 12 during the session.

Client 12 establishes another connection with session server 24 at step 176, and session server 24 receives a data request 108 from client 12 at step 178. If session server 24 has not already accessed data source 26 one time during the session for client 12 at step 180, session server 24 receives information associated with client 12 from data source 26 at step 182. If session server 24 has already accessed data source 26 one time during the session for client 12 at step 180, the method proceeds directly to step 184, where session server 24 either generates new session data 32 or accesses existing session data 32. The present invention contemplates session server 24 reaccessing data source 26 during the session only one time, a minimal number of times, or less times than would be required if session server 24 did not maintain session data 32 during the session. As discussed more fully above with reference to FIG. 3, session server 24 generates new session data 32 as client 12 progresses from the current state to a child of the current state, and accesses existing session data 32 as client 12 progresses from the current state to an ancestor of the current state, in accordance with defined state hierarchy 50.

Session server 24 conveys the new or existing session data 32 to client 12 at step 186, in the form of HTML pages or in some other suitable manner, and the connection with client 12 is terminated at step 188. At step 190, session server 24 again maintains session data 32 for subsequent access by client 12 during the communications session. If the session for client 12 has not terminated at step 192, the method returns to step 176, where client 12 establishes another connection with session server 24. If the session has terminated at step 192, the method ends.

Figure 6:
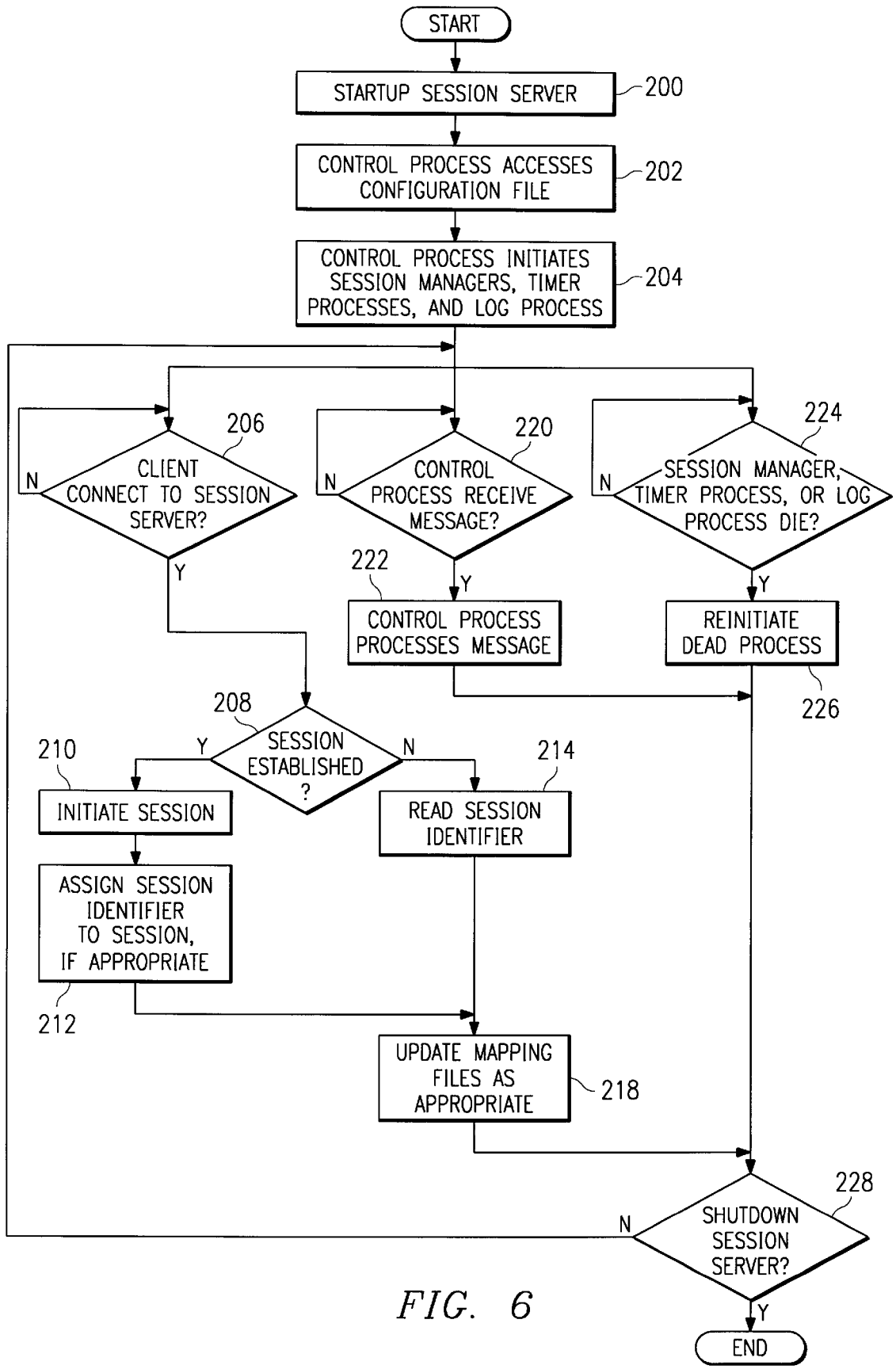
FIG. 6 illustrates a method of operation of an exemplary control process according to the present invention.

FIG. 6 illustrates a method of operation of an exemplary control process 100 during the operation of session server 24. The method beings at step 200, where session server 24 is initiated, powered on, started up, or otherwise begins operating. At step 202, control process 100 accesses one or more configuration parameters in configuration file 101 to determine, without limitation: the number of session managers 112 to initiate to service clients 12, specified aspects of the operation of session managers 112, the number of timer processes 130 to initiate to interact with session managers 112, the length of specified time intervals and other aspects of the operation of timer processes 130, and other information concerning the operation of session server 24. At step 204, control process 100 initiates session managers 112, timer processes 130, and log process 140 according to the configuration parameters accessed at step 202.

In parallel or using a serial polling technique, control process 100 waits for clients 12 to connect to session server 24 at step 206; waits to receive messages from other components of session server 24 or system 10 at step 220; and waits for session managers 112, timer processes 130, or log process 140 to terminate, die, or cease processing at step 224. If client 12 establishes a connection with session server 24 at step 206, and no communications session has been established for client 12 at step 208, session server 24 initiates a session for client 12 at step 210. At step 212, control process 100 may assign a unique session identifier to the session, alone or in cooperation with CGI 102, for entry into session manager mapping file 110 and timer process mapping file 124.

If client 12 establishes a connection with session server 24 at step 206, and a session has already been established for client 12 at step 208 as a result of a previous connection with session server 24, control process 100 reads the unique session identifier corresponding to the session at step 214 for controlling and monitoring various operations of session server 24 associated with the session. At step 218, control process may update session manager mapping file 110 and timer process mapping file 124, alone or in cooperation with CGI 102, session managers 112, and timer processes 130, to reflect the association of particular session managers 112 and particular timer processes 130 with the session during the operation of session server 24.

If control process 100 receives a message at step 220, control process 100 processes the received message at step 222. If session manager 112, timer process 130, or log process 140 terminates, dies, or ceases processing at step 224, control process 100 reinitiates session manager 112, timer process 130, or log process 140 at step 226. If session server 24 has not been terminated, powered off, shut down, or otherwise ceased operating at step 228, the method returns to steps 206, 220, and 224, where client 12 may connect to session server 24; control process 100 may receive a message from another component of session server 24 or system 10; or session managers 112, timer processes 130, or log process 140 may terminate, die, or cease processing; respectively. If session server 24 has been terminated, powered off, shut down, or otherwise ceased operating at step 228, the method ends.

Figure 7:
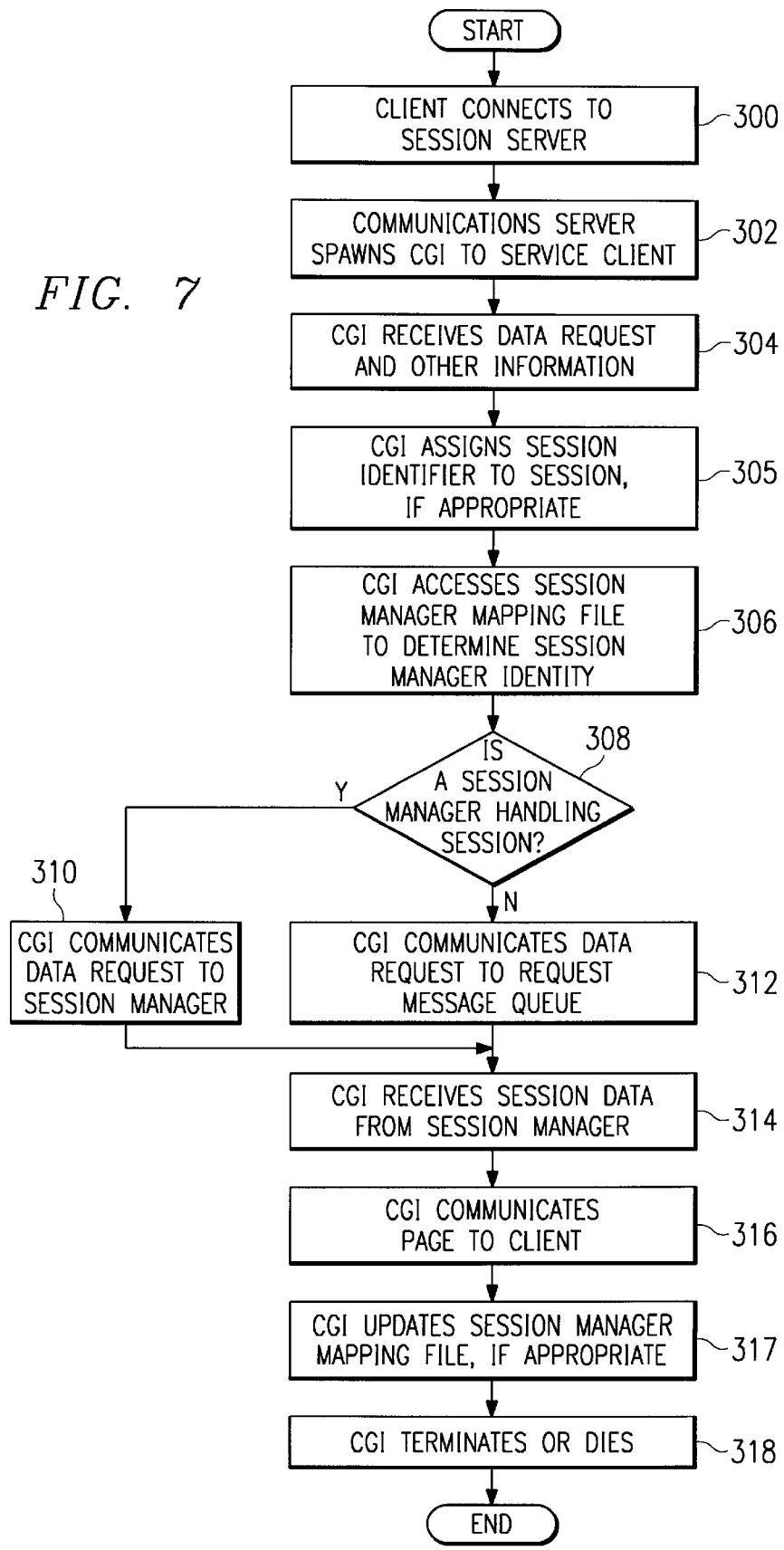
FIG. 7 illustrates a method of operation of an exemplary common gateway interface according to the present invention.

FIG. 7 illustrates a method of operation of an exemplary CGI 102 during the operation of session server 24. The method begins at step 300, where client 12 establishes a connection with session server 24. At step 302, communications server 22 spawns or otherwise generates CGI 102 to communicate with client 12 during the connection. CGI 102 receives one or more data requests 108 or other inputs from client 12 at step 304. Inputs from client 12 may include one or more session and state identifiers that correspond, respectively, to the session for client 12 and the state in state hierarchy 50 that client 12 has chosen to enter.

At step 305, CGI 102 may assign a unique session identifier to the session, alone or in cooperation with control process 100. Session and state identifiers for client 12 may be maintained at client 12 within a page conveyed to client 12 as a result of a previous connection; may be determined at session server 24 according to input from client 12 and a uniform resource locator (URL), Internet protocol (IP), or other address associated with client 12; or may be generated, determined, or received in any other suitable manner at step 304. In one embodiment, CGI 102 receives inputs from client 12 in the form of environment variables communicated from communications server 22.

At step 306, CGI 102 accesses session manager mapping file 110 to determine the identity of a particular session manager 112, if any, that is currently handling the session. If a particular session manager 112 is handling the session at step 308, CGI 102 communicates data request 108 to session manager 112 at step 310. If no session manager 112 is handling the session at step 308, CGI 102 communicates data request 108 to request message queue 111 at step 312 for subsequent access by an available session manager 112. CGI 102 may update session manager mapping file 110, alone or in cooperation with session manager 112, control process 100, or both. After session manager 112 processes data request 108 to generate session data 32 in accordance with data request 108 and state hierarchy 50, CGI 102 receives the appropriate session data 32 from session manager 112 at step 314.

As discussed more fully above in connection with FIGS. 1 through 4, session manager 112 may convey session data 32 to client 12 in the form of pages or other arrangement of information that includes HTML, JAVA, or other page development language. CGI 102 may receive session data 32 from session manager 112 at step 314 that corresponds to one or more states that client 12 entered, interacted with, or progressed through in interacting with session server 24. CGI 102 may receive session data 32 at step 314 that corresponds to an error state within state hierarchy 50. CGI 102 communicates the received session data 32 to communications server 22 and client 12 at step 316, in the form of one or more pages or otherwise, and updates session manager mapping file 110 at step 317, alone or in cooperation with session manager 112, control process 100, or both. At step 318, CGI 102 terminates or dies and the method ends.

Figure 8A:
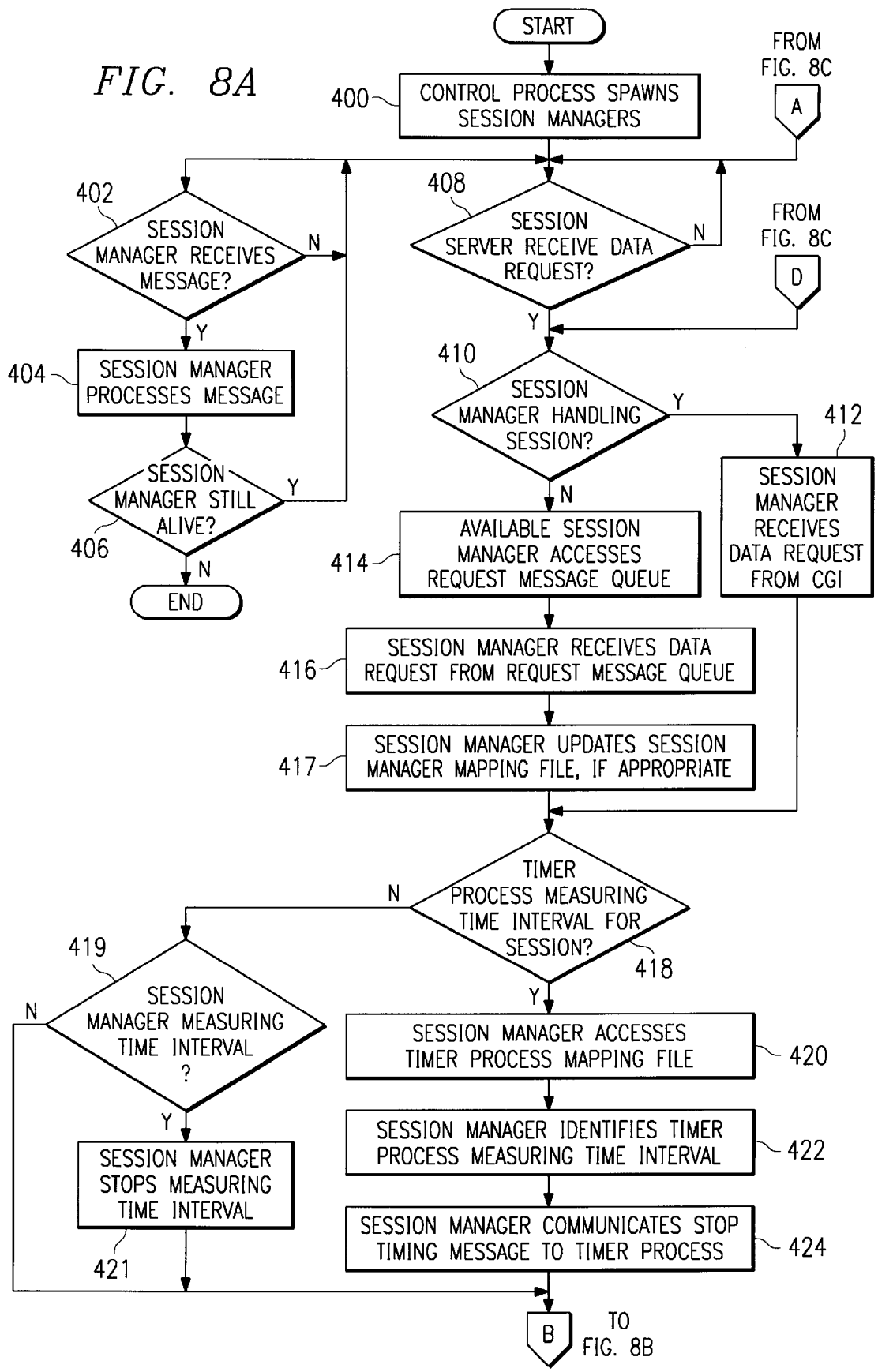
FIGS. 8A–8C illustrate a method of operation of an exemplary session manager according to the present invention.
Figure 8B:
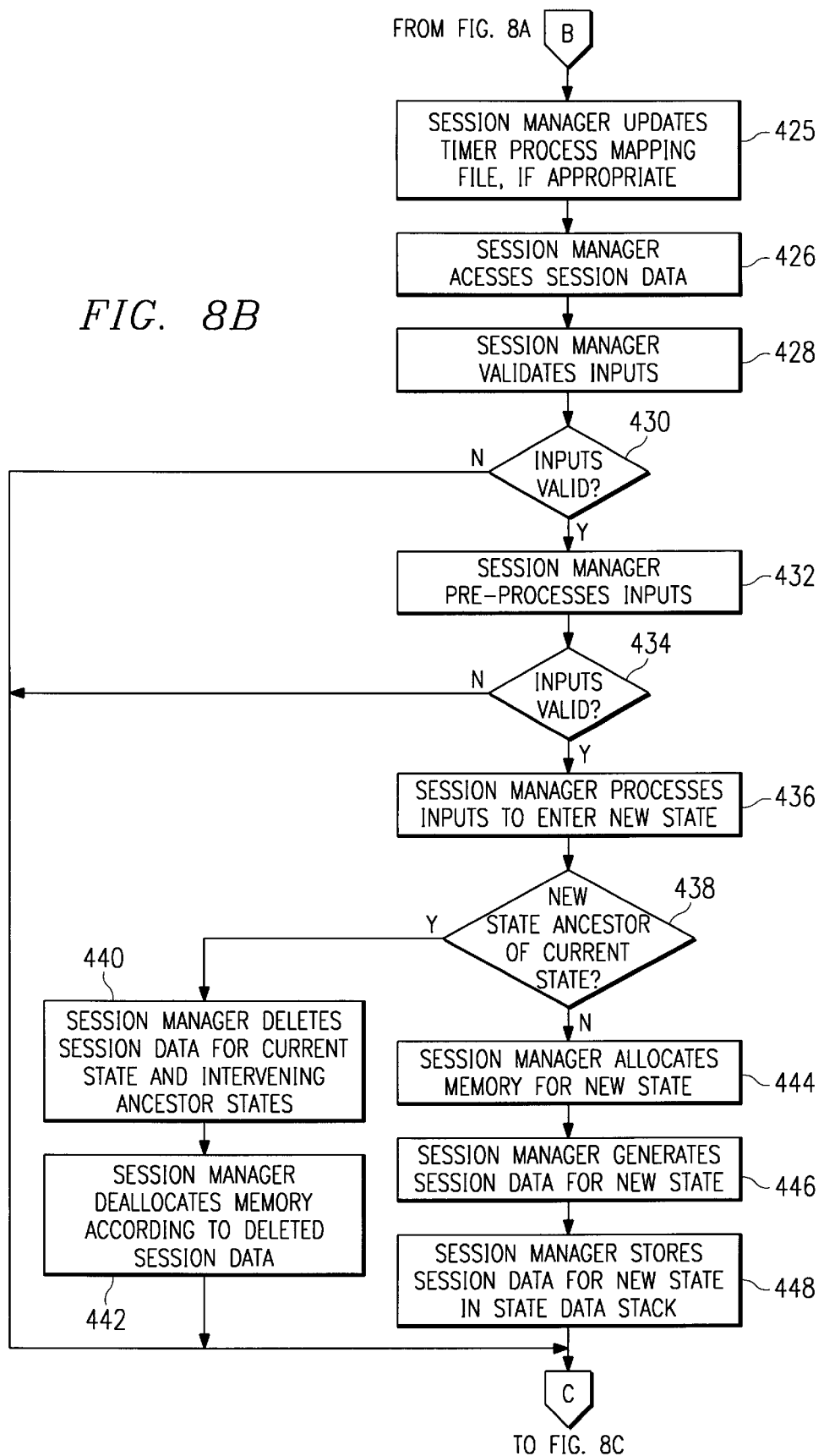
Figure 8C:
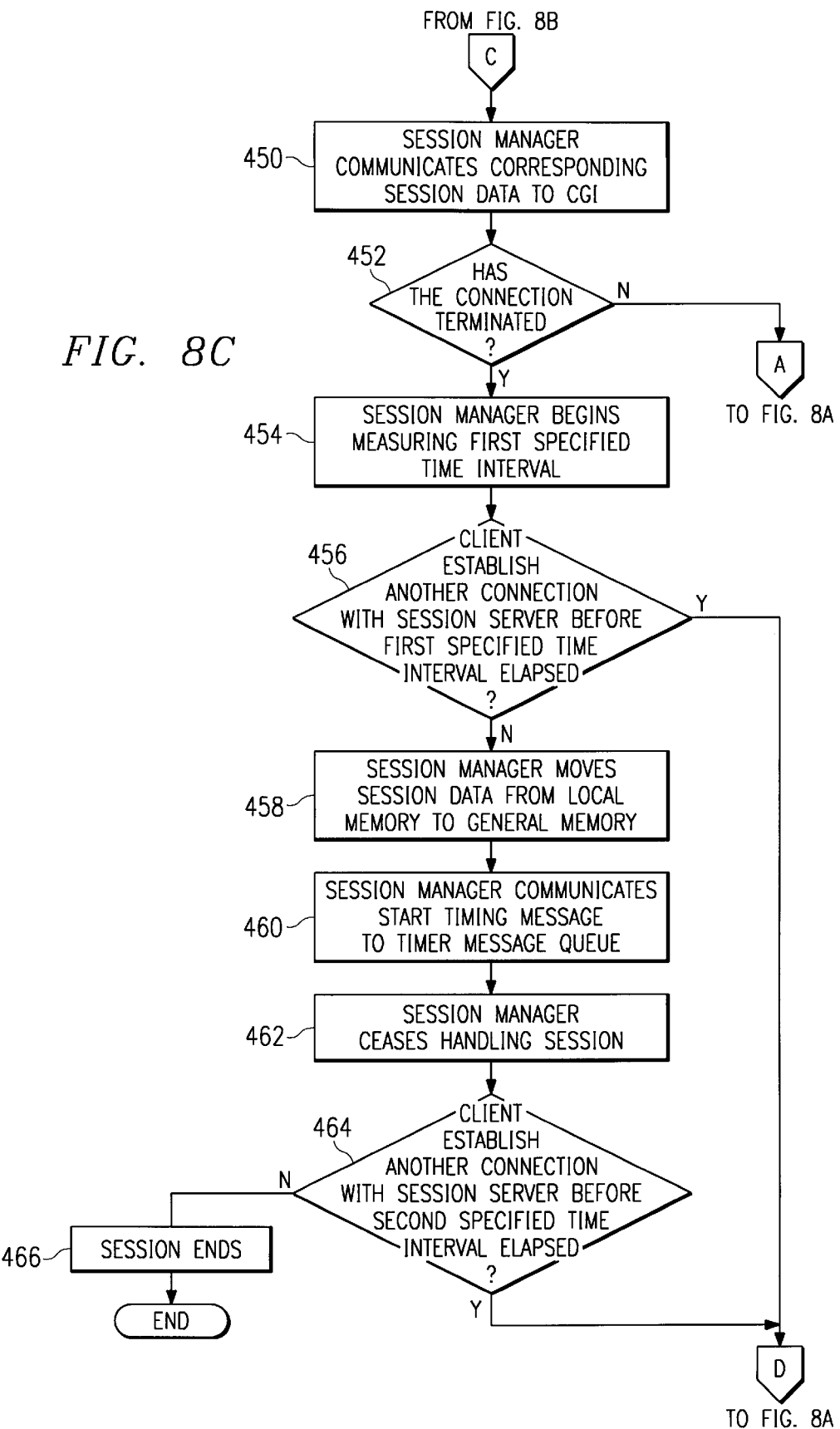

FIGS. 8A–8C illustrates a method of operation of an exemplary session manager 112 during the operation of session server 24. The method begins at step 400, where control process 100 spawns or generates session managers 112 in accordance with configuration parameters contained in configuration file 101. Session managers 112 wait to receive commands, instructions, or other messages at step 402 from other components of session server 24 or system 10. If session manager 112 receives a message at step 402, session manager 112 processes the message at step 404. If session manager 112 is still alive and processing at step 406, the method returns to step 402, where session manager 112 again waits to receive a message. If session manager 112 is terminated, dead, or has otherwise ceased processing at step 406, the method ends.

In addition to waiting to receive messages at step 402, session managers 112 wait to receive data requests 108 and other information communicated to session server 24 at step 408. If session server 24 receives a data request 108 at step 408, and a particular session manager 112 is currently handling the session at step 410, as indicated by the session identifier to session manager identifier relationship in session manager mapping file 110, the particular session manager 112 receives data request 108 from CGI 102 at step 412. If no session manager 112 is currently handling the session at step 410, as indicated by the session identifier to session manager identifier relationship in session manager mapping file 110, an available session manager 112 accesses request message queue 111 at step 414, receives data request 108 from request message queue 111 at step 416, and updates session manager mapping file 110 at step 417, alone or together with CGI 102, control process 100, or both.

If a particular timer process 130 is currently measuring a specified time interval for the session at step 418, in which case the previous connection with client 12 has terminated and client 12 has established another connection with session server 24, session manager 112 accesses timer process mapping file 124 at step 420 and identifies the particular timer process 130 at step 422. Session manager 112 communicates a stop timing message to timer process 130 at step 424, updates timer process mapping file 124 at step 425, alone or in cooperation with timer process 130, control process 100, or both, and accesses session data 32 in local memory 113 according to data request 108 at step 426. If no timer process 130 is measuring a specified time interval for the session at step 418, and session manager 112 is measuring the first specified time interval at step 419, session manager 112 stops measuring the first specified time interval at step 421. If session manager 112 is not measuring the first specified time interval at step 419, the method proceeds directly to step 425.

At step 428, session manager 112 validates inputs to session manager 112 using validate inputs process 120, for example, the inputs contained in or otherwise associated with data request 108. These inputs may include session and state identifiers associated with a token from client 12 to indicate the session corresponding to client 12 and the state in state hierarchy 50 that client 12 has chosen to enter, interact with, or progress through, respectively. In one embodiment, session manager 112 or associated API 118 calls validate inputs process 120 to verify that the inputs to session manager 112 include a session identifier or that session manager 112 can generate a new session identifier;

that the inputs to session manager 112 include a state identifier or that session manager 112 can generate a new state identifier; or that the inputs to session manager 112 are suitable in any other respect.

If the inputs to session manager 112 are valid at step 430, session manager 112 pre-processes the inputs at step 432 using pre-process inputs process 120. Session manager 112 or associated API 118 may call pre-process inputs process 120 to allow session manager 112 to perform any suitable operation to validate selected aspects of the inputs, whether the inputs are received from client 12, data source 26, or generated automatically by components of session server 24 or system 10, such as a username, a password, a session identifier, a state identifier, a data entry format, and other aspects. If the inputs to session manager 112 are invalid at step 430 or 434, the method proceeds to step 450, where session manager 112 conveys session data 32 corresponding to an error state in state hierarchy 50 to CGI 102. For example, session data 32 may be conveyed to client 12 as an HTML page that requests client 12 to provide another data request 108 or other inputs for communication to session manager 112.

If the inputs are valid at step 434 according to validate inputs and pre-process inputs processes 120, session manager 112 processes the inputs to enter a new state at step 436, which may be the current state, a child of the current state, or an ancestor of the current state. In one embodiment, inputs are passed to the new state as parameters that allow session manager 112 to generate session data 32 for the new state. If the new state is an ancestor of the current state at step 438, session manager 112 causes session data 32 for the current state and any intervening ancestors of the current state to be deleted from state data stack 150 at step 440. At step 442, session manager 112 causes memory to be deallocated in accordance with the deletion of session data 32 at step 440. In one embodiment, session manager 112 or associated API 118 calls deallocate stack data process 120 at step 442 to deallocate memory as client 12 progresses from the current state to the ancestor state.

If the new state is not an ancestor state of the current state at step 438, session manager 112 causes memory to be allocated at step 444 for session data 32 corresponding to the new state. Session manager 112 or associated API 118 may call allocate stack data process 120 at step 444 to dynamically allocate memory to create objects or other application defined data structures as client 12 progresses to a child of the current state. At step 446, session manager 112 generates session data 32 for the new state using inputs received from client 12, information previously retrieved from data source 26, or information contained in one or more ancestor states. In one embodiment, each ancestor state may contain all of the information retrieved from data source 26 that is needed to generate any child state of the particular ancestor state in the defined state hierarchy 50. Session manager 112 stores session data 32 in state data stack 150 in local memory 113 at step 448.

At step 450, session manager 112 communicates session data 32 to CGI 102 for subsequent communication to communications server 22 and client 12, in the form of pages or otherwise. At step 452, if the connection with client 12 has not terminated, the method returns to step 408, where session server 24 may receive another data request 108 or other information from client 12. If the connection with client 12 has terminated at step 452, session manager 112 begins measuring the first specified time interval at step 454, or communicates a start timing message to timer message queue 126 that instructs timer process 130 to begin measuring the first specified interval. If client 12 establishes another connection with session server 24 before the first specified time interval elapses at step 456, as measured by session manager 112, timer process 130, the method returns to step 410, where a determination is made that session manager 112 is handling the corresponding session. If client 12 does not establish another connection with session server 24 before the first specified time interval elapses at step 456, session manager 112 causes session data 32 for the communications session to be copied from local memory 113 to general memory 128 at step 458.

At step 460, session manager communicates a start timing message to timer message queue 126 that will instruct an available timer process 130 to begin measuring the second specified time interval. At step 462, session manager 112 ceases handling the session. If client 12 establishes another connection with session server 24 before the second specified time interval has elapsed at step 464, the method returns to step 410, where a determination is made that no session manager 112 is currently handling the session. If client 12 does not reconnect to session server 24 before the second specified time interval has elapsed at 464, the session for client 12 ends at step 466 and the method ends.

Figure 9:
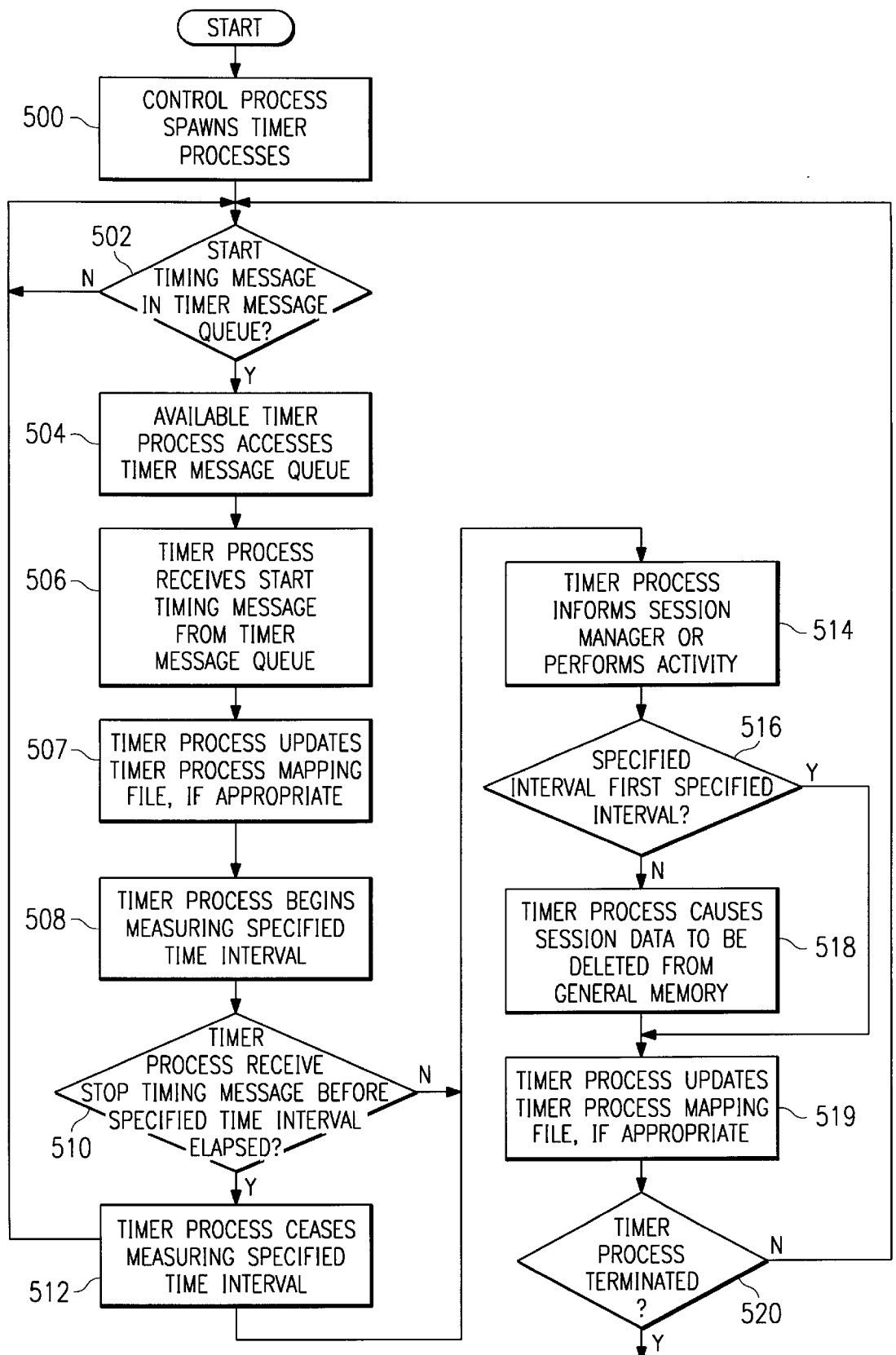
FIG. 9 illustrates a method of operation of an exemplary timer process according to the present invention.

FIG. 9 illustrates a method of operation of an exemplary timer process 130 during the operation of session server 24. The method begins at step 500, where control process 100 spawns or otherwise generates timer processes 130 in accordance with the configuration parameters contained in configuration file 101. At step 502, timer processes 130 wait for session managers 112 to communicate start timing messages to timer message queue 126 for access by timer processes 130. If a start timing message is in timer message queue 126 at step 502, an available timer process 130 accesses timer message queue 126 at step 504, and receives the start timing message from timer message queue 126 at step 506. At step 507, timer process 130 updates timer process mapping file 124, alone or in combination with session manager 112, control process 100, or both.

At step 508, timer process 130 begins measuring a specified time interval. The specified time interval may be the first specified time interval, for example, a two minute interval that corresponds to the length of time since client 12 disconnected from session server 24, or the second specified time interval, for example, an eight minute interval that corresponds to the length of time since session server 112 ceased handling the session. If timer process 130 receives a stop timing message from session manager 112 before the specified time interval has elapsed at step 510, timer process 130 ceases measuring the specified time interval at step 512 and the method returns to step 502, where timer process 130 waits for session managers 112 to communicate a start timing message to timer message queue 126.

If timer process 130 does not receive a stop timing message from session server 112 before the specified time interval has elapsed at step 510, the method proceeds to step 514, where timer process 130 may inform the particular session manager 112 that communicated the start timing message that the specified time interval has elapsed or may perform another activity consistent with the specified time interval having elapsed. If the specified time interval is the first specified time interval at step 516, and timer process 130 measured the first specified time interval rather than session manager 112, the method proceeds directly to step 520, where a determination is made whether timer process 130 has been terminated in some manner by control process 100 or otherwise. If the specified time interval is the second specified time interval at step 516, timer process 130 causes or initiates the deletion of session data 32 from general memory 128 at step 518, and updates timer process mapping file 124 at step 519, alone or in cooperation with session manager 112, control process 100, or both. If timer process 130 has not been terminated at step 520, the method returns to step 502, where timer process 130 again waits for session managers 112 to communicate a start timing message for storage in timer message queue 126. If timer process 130 has been terminated at step 520, the method ends.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A system for communicating information using the Internet, comprising:

a data source;

a session server coupled to the data source;

a client operable to establish a first connection with the session server using the Internet to initiate an interactive communications session with the session server;

the session server operable to receive information from the data source in response to the first connection, the session server operable to assign a unique session identifier to the interactive communications session corresponding to the client, the session server operable to generate session data using the received information and to convey at least some of the session data to the client, the session server operable to store session data for the interactive communications session according to the unique session identifier, the session data being arranged in a state hierarchy comprising a plurality of states, each state associated with a particular page that has been conveyed to the client during the interactive communications session, the plurality of states comprising an ancestor state associated with a first page and a child state associated with a second page and generated according to inputs from the ancestor state, the session server operable to maintain the session data for the ancestor state and the child state after termination of the first connection and for the duration of the interactive communications session, the session server operable to convey at least some of the session data maintained after termination of the first connection to the client using the Internet in response to the client establishing a second connection with the session server using the Internet during the interactive communications session and in response to the session server identifying the stored session data for the client's interactive communications session using the unique session identifier, the session data conveyed in response to the second connection comprising the session data for the child state, the session data for the child state being conveyed to the client in response to the second connection independent of whether the session data for the ancestor state is conveyed to the client in response to the second connection.

2. The system of claim 1, wherein the session server accesses the data source only once during the interactive communications session.

3. The system of claim 1, wherein the plurality of states comprises:

an ancestor state associated with a first page conveyed to the client in response to the first connection;

a child state associated with a second page conveyed to the client in response to the first connection and also conveyed to the client in response to the second connection independent of whether the first page is conveyed to the client in response to the second connection; and a grandchild state associated with a third page conveyed to the client in response to the second connection, the session data for the grandchild state being generated according to inputs received from the child state in response to the second connection.

4. The system of claim 3, wherein the system is further operable to convey the second page to the client in response to the client providing inputs to the ancestor state.

5. The system of claim 1, wherein the inputs received from the ancestor sate comprise:

inputs the ancestor state received from the client; and information the ancestor state received from the data source.

6. The system of claim 1, wherein the session server comprises a timer process operable to cause deletion of session data if a time interval between the first connection and the second connection exceeds a predetermined threshold.

7. The system of claim 1, wherein, in response to the second connection, the session server identifies the session data that was last conveyed to the client in response to the first connection according to a unique state identifier corresponding to the last conveyed session data, the last conveyed session data corresponding to the child state.

8. A session server for communicating information with a client using the Internet, comprising:

a common gateway interface operable to receive a data request from the client during an interactive communications session, the interactive communications session initiated in response to a first connection to the session server using the Internet, the session server operable to assign a unique session identifier to the interactive communications session corresponding to the client, the common gateway interface further operable to communicate the data request;

a session manager coupled to the common gateway interface and operable to receive the data request from the common gateway interface, the session manager further operable to receive information from a data source and to generate session data using the received information, the session data generated according to the data request, the session manager operable to store session data for the interactive communications session according to the unique session identifier, the session data being arranged in a state hierarchy comprising a plurality of states, each state associated with a particular page that has been conveyed to the client associated with the data request during the interactive communications session, the plurality of states comprising an ancestor state associated with a first page and a child state associated with a second page and generated according to inputs from the ancestor states, the session manager operable to maintain the session data for the ancestor state and the child state after termination of the first connection and for the duration of the interactive communications session, the session manager operable to convey at least some of the session data maintained after termination of the first connection to the client using the Internet in response to the client establishing a second connection to the session server using the Internet during the interactive communications session and in response to the session manager identifying the stored session data for the client's interactive communications session using the unique session identifier, the session data conveyed in response to the second connection comprising the session data for the child state, the session data for the child state being conveyed to the client in response to the second connection independent of whether the session data for the ancestor state is conveyed to the client in response to the second connection.

9. The server of claim 8, wherein the session manager receives information from the data source only once during the interactive communications session.

10. The server of claim 8, wherein the plurality of states comprises:

an ancestor state associated with a first page conveyed to the client in response to the first connection;

a child state associated with a second page conveyed to the client in response to the first connection and also conveyed to the client in response to the second connection independent of whether the first page is conveyed to the client in response to the second connection; and a grandchild state associated with a third page conveyed to the client in response to the second connection, the session data for the grandchild state being generated according to inputs received from the child state in response to the second connection.

11. The system of claim 10, wherein the server is further operable to convey the second page to the client in response to the client providing inputs to the ancestor state.

12. The server of claim 8, wherein the inputs received from the ancestor state comprise:

inputs the ancestor state received from the client; and information the ancestor state received from the data source.

13. The server of claim 8, further comprising a timer process operable to cause deletion of session data if a time interval between the first connection and the second connection exceeds a predetermined threshold.

14. The server of claim 8, further comprising a timer process operable to cause the session manager to cease handling the interactive communications session.

15. The system of claim 8, wherein, in response to the second connection the session manager identifies the session data last conveyed to the client in response to the first connection according to a unique state identifier corresponding to the last conveyed session data, the last conveyed session data corresponding to the child state.

16. A method for communicating information using the Internet, the method comprising:

establishing a first connection with a client using the Internet to initiate an interactive communications session;

assigning a unique session identifier to the interactive communications session corresponding to the client;

receiving information associated with the client from a data source;

generating session data according to the received information;

conveying at least some of the session data to the client in response to the first connection;

storing the session data for the interactive communications session according to the unique session identifier, the session data being arranged in a state hierarchy comprising a plurality of states, each state associated with a particular page that has been conveyed to the client associated with the request during the interactive communication session, the plurality of states comprising an ancestor state associated with a first page and a child state associated with a second page and generated according to inputs from the ancestor state;

terminating the first connection;

maintaining the session data for the ancestor state and the child state after termination of the first connection and for the duration of the interactive communications session;

establishing a second connection with the client during the interactive communications session;

identifying the stored session data for the client's interactive communications session using the unique session identifier; and conveying to the client, after termination of the first connection and during the interactive communications session for the client in response to the second connection, at least some of the session data maintained after termination of the first connection, the session data conveyed in response to the second connection comprising the session data for the child state, the session data for the child state being conveyed to the client in response to the second connection independent of whether the session data for the ancestor state is conveyed to the client in responses to the second connection.

17. The method of claim 16, wherein information is received from the data source only once during the first interactive communications session.

18. The method of claim 16, wherein the plurality of states comprises:

an ancestor state associated with a first page conveyed to the client in response to the first connection;

a child state associated with a second page conveyed to the client in response to the first connection and also conveyed to the client in response to the second connection independent of whether the first page is conveyed to the client in response to the second connection; and a grandchild state associated with a third page conveyed to the client in response to the second connection, the session data for the grandchild state being generated according to inputs received from the child state in response to the second connection.

19. The method of claim 16, wherein the inputs received from the ancestor state comprise:

inputs the ancestor state received from the first client; and information the ancestor state received from the data source.

20. The method of claim 16, further comprising:

establishing a first connection with a second client to initiate a second interactive communications session; and maintaining second session data for the second client separately from the first session data.

21. The method of claim 16, further comprising:

terminating the first interactive communications session if a time interval between the first connection and the second connection exceeds a predetermined threshold; and deleting the first session data.

22. The method of claim 16, further comprising the step of conveying the second page to the client in response to the client providing inputs to the ancestor state.

23. The method of claim 16, further comprising the step of identifying, in response to the second connection, the session data last conveyed to the client in response to the first connection according to a unique state identifier corresponding to the last conveyed session data, the last conveyed session data corresponding to the child state.

* * * * *

UNITED STATES PATENT AND TRADEMARK OFFICE
CERTIFICATE OF CORRECTION

PATENT NO.   : 5,835,724
DATED        : November 10, 1998
INVENTOR(S)  : John D. Smith It is certified that error appears in the above-indentified patent and that said Letters Patent is hereby corrected as shown below:

Title page, item [54] and col. line 2, in the title, delete "COMMUNICATION" and insert --COMMUNICATING--

Signed and Sealed this

Nineteenth Day of October, 1999

Attest:

Attesting Officer

Q. TODD DICKINSON
Acting Commissioner of Patents and Trademarks